US011929595B2

(12) United States Patent
Fitzpatrick et al.

(10) Patent No.: US 11,929,595 B2
(45) Date of Patent: Mar. 12, 2024

(54) PLASMA ASSISTED SPARK IGNITION SYSTEMS AND METHODS

(71) Applicant: TRANSIENT PLASMA SYSTEMS, INC., Torrance, CA (US)

(72) Inventors: Joseph F. Fitzpatrick, Glendale, CA (US); Mark A. Thomas, Redondo Beach, CA (US); Alonzo Gomez, Los Angeles, CA (US); Jason M. Sanders, La Crescenta, CA (US)

(73) Assignee: Transient Plasma Systems, Inc., Torrance, CA (US)

( * ) Notice: Subject to any disclaimer, the term of this patent is extended or adjusted under 35 U.S.C. 154(b) by 0 days.

(21) Appl. No.: 17/722,943

(22) Filed: Apr. 18, 2022

(65) Prior Publication Data

US 2022/0337036 A1 Oct. 20, 2022

Related U.S. Application Data

(60) Provisional application No. 63/177,102, filed on Apr. 20, 2021.

(51) Int. Cl.
*H01T 15/00* (2006.01)

(52) U.S. Cl.
CPC .................................... *H01T 15/00* (2013.01)

(58) Field of Classification Search
CPC ......... H01T 15/00; H01T 13/20; H01T 13/32; H01T 13/52; H05H 2242/22; H05H 1/52; F02P 9/007; F02P 13/00; F02P 23/045
See application file for complete search history.

(56) References Cited

U.S. PATENT DOCUMENTS

| | | | | |
|---|---|---|---|---|
| 6,095,124 A * | 8/2000 | Matsubara | .............. | H01T 13/52 123/169 EL |
| 6,321,733 B1 * | 11/2001 | Suckewer | ............... | H01T 13/50 123/620 |
| 9,225,151 B2 * | 12/2015 | Douglas | ................ | H01T 13/467 |

(Continued)

FOREIGN PATENT DOCUMENTS

| | | |
|---|---|---|
| JP | 2000208234 A | 7/2000 |
| JP | 2003017215 A | 1/2003 |
| KR | 101749685 B1 | 6/2017 |

OTHER PUBLICATIONS

International Search Report and Written Opinion dated Aug. 19, 2022 in PCT/US2022/024815.

*Primary Examiner* — Sizo B Vilakazi
(74) *Attorney, Agent, or Firm* — Cozen O'Connor

(57) ABSTRACT

A plasma assisted spark ignition system includes an ignitor and a power supply. The first ignitor includes: a casing having a first end, a second end that forms a first electrode, and a longitudinally extending passage, a second electrode which protrudes longitudinally outward from an opening at the second end of the casing and laterally spaced inwardly to form a spark gap, and an electrical insulator (dielectric) surrounding a portion of the second electrode, and which has a terminus that is at least closely spaced to an interior surface of the end of the casing. The power supply supplies a plurality of voltage pulses to the ignitor per ignition event to generate a flash over on the dielectric. Subsequent pulses in an ignition event may be at lower amplitude than an initial pulse in the ignition event. Pulses may, for example, have a duration on the order of a nanosecond.

25 Claims, 7 Drawing Sheets

(56) References Cited

U.S. PATENT DOCUMENTS

| | | | | |
|---|---|---|---|---|
| 9,401,586 | B1 * | 7/2016 | Nakamura | H01T 13/12 |
| RE47,073 | E * | 10/2018 | Martin | H01T 13/467 |
| 2016/0028214 | A1 * | 1/2016 | Mukoyama | H01T 13/32 313/139 |
| 2018/0038337 | A1 * | 2/2018 | Mukoyama | F02B 19/1004 |
| 2018/0363618 | A1 * | 12/2018 | Kinoshita | F02P 3/01 |

* cited by examiner

PLASMA ASSISTED SPARK IGNITION SYSTEMS AND METHODS

CROSS-REFERENCE TO RELATED APPLICATION

The application claims priority to U.S. Provisional Application Ser. No. 63/177,102 filed Apr. 20, 2021, the content of which is incorporated herein by reference in its entirety.

STATEMENT REGARDING FEDERALLY SPONSORED RESEARCH OR DEVELOPMENT

This invention was made with Government support under ASSISTANCE AGREEMENT DE-SC0013824 awarded by the United States Department of Energy. The Government has certain rights in the invention.

COPYRIGHT NOTICE

A portion of the disclosure of this patent document contains material that is subject to copyright protection owned Transient Plasma Systems, Inc. ©Transient Plasma Systems, Inc. 2021. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This description relates to plasma assisted spark ignition systems and methods, and in particular to an ignitor, for example a spark plug and a power supply operable to provide voltage pulses to the ignitor (e.g., a plurality of voltage pulses per ignition event), where the structure of the ignitor produces a surface flashover on a dielectric (e.g., ceramic, porcelain) insulator of the ignitor allowing the generation of subsequent sparks or arcs across a spark gap of the ignitor or spark plug with relatively lower energy input, improving performance both in terms of lean limits and repeatability, and reducing the production of nitrous oxides ($NO_x$) is improved.

BACKGROUND

Environmental, climate, and economic concerns make it desirable to operate combustion engines "leaner" (i.e., higher lambda values, which means more air and less fuel in each combustion charge). Conventional spark gap based ignition systems have difficulty consistently igniting lean fuel mixtures.

Researchers and several companies have tried to address the difficulty of consistently igniting lean fuel mixtures by using high energy, non-thermal plasma for ignition.

Various implementations exist, but many ignitors (e.g., the spark plug in a conventional ignition system) have tried to use some form of a corona discharge.

In research, such ignitors demonstrate the theoretical benefits of plasma-based ignition. The large streamers (e.g., a type of transient electrical discharge which forms at the surface of a conductive electrode) create a larger combustion kernel and the plasma induces measurable changes in the aerosol (i.e., fuel air mixture), which appear to improve the quality and probability of combustion. However, original equipment manufacturers (OEMs) and researchers have reported that such ignitors require excessive power at higher gas pressures and are prone to arc breakdown inside a combustion chamber because of the electrically conductive nature of the resulting combustion kernels. The conventional ignitors themselves are also relatively expensive and complex.

To circumvent some of these problems, researchers and some companies have also tried barrier discharge ignitors, where two electrodes are separated by a dielectric barrier. However, such discharges lose the volumetric opportunity of a corona discharge. In attempt to compensate for the resultant problems, these conventional ignitors are provided with larger electrode distances and extended dielectric surfaces.

These large surfaces and electrode distances drive the power requirement per combustion event to a level that is impractically high for most applications. In addition, the attempts to increase volumetric opportunity are generally not very effective. For example, in one design, the discharge is strongest at the location at which the electrodes are closest, i.e., at the base of the tip, which is a non-ideal location from which to initiate combustion kernels. Again, the ignitors themselves are relatively complex and expensive.

BRIEF SUMMARY

Transient Plasma Systems (TPS) has performed extensive testing with its pulse power technology and conventional (commercial and proven) J-gap spark plugs.

The combustion results in testing have historically been very good but there are improvements that can be implemented with respect to efficiency. First, with a relatively small (<1 mm) spark gap, the voltage potential required to produce significant plasma is very close to the point where the gap breaks down and an arc occurs. When an arc occurs, the voltage collapses, and any field dependent helpful chemistry, ceases.

To compensate for this, the system relies on larger spark gap sizes to create volumetric opportunity and then uses additional higher energy pulses to accelerate kernel growth in lean combustion situations. Both of these adaptations translate into more power flowing through the spark plug, which in general is suboptimal for reducing plug wear.

The systems and methods described herein employ a unique ignitor (e.g., spark plug) driven via voltages pulses (e.g., nanosecond voltage pulses) that provides a greater level of power that flows through the ignitor or spark plug, while improving performance both in terms of lean limits as well as repeatability (i.e., ensuring plasma benefits are present in every combustion event). This may allow the systems and methods to maintain the desirable lean combustion characteristics enabled by a described ignitor (e.g., spark plug), while also limiting the average power draw (i.e., reduce the energy required per ignition event). The electrical energy required for sufficient extension in stable lean limit combustion is reduced significantly by the ignitor (e.g., spark plug) utilized along with the ignition sequence described herein. The described ignition sequence uses plasma assistance to generate a spark (e.g., nanosecond spark), which is sustained by a subsequent sequence of low voltage, low energy pulses. The benefits to this approach may include: 1) a significant reduction in per ignition energy required (pulses delivered after striking the initial spark (e.g., nanosecond spark) per ignition event have 50-100 times less energy than a conventional ignition pulse); and 2) reduced parasitic losses that occur when unwanted discharges occur inside the ignitor or spark plug itself (the reduced voltage required after striking an arc (e.g., a nanosecond arc) lowers the probability of an unwanted internal discharge). These improvements, combined with other energy saving approaches, may advantageously reduce the electrical energy required for stable, lean ignition, resulting in increased ignitor or spark plug durability. While often presented in terms of nanosecond voltage pulses (e.g., voltage pulse with a duration on the order of nanoseconds, for instance equal to or less than 10 nanoseconds), the various apparatus, methods an techniques are not necessarily limited to such durations and may be applied to voltage pulses of longer durations, for instance voltage pulses with durations on the order of several milliseconds.

The foregoing summary does not encompass the claimed subject matter in its entirety, nor are the various illustrated and/or described implementations or embodiments intended to be limiting. Rather, the illustrated and/or described implementations or embodiments are provided as mere examples.

The present disclosure addresses these and other needs.

Other features of the illustrated and/or described implementations or embodiments will become apparent from the following detailed description, taken in conjunction with the accompanying drawings, which illustrate, by way of example, the principles of the illustrated and/or described implementations or embodiments.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE PREFERRED EMBODIMENTS

In the following description, certain specific details are set forth in order to provide a thorough understanding of various disclosed implementations and embodiments. However, one skilled in the relevant art will recognize that embodiments may be practiced without one or more of these specific details, or with other methods, components, materials, etc. In other instances, well-known structures associated with pulse generators, for example nanosecond pulse generators, spark ignition sources, for example spark plugs, cables that couple pulse generators to spark ignition sources, for example coaxial cables, plasma generation, gas delivery systems, and/or internal combustion engines have not been shown or described in detail to avoid unnecessarily obscuring descriptions of the implementations and embodiments.

Unless the context requires otherwise, throughout the specification and claims which follow, the word “comprise” and variations thereof, such as, “comprises” and “comprising” are to be construed in an open, inclusive sense, that is, as “including, but not limited to.”

Reference throughout this specification to “one embodiment” or “an embodiment” means that a particular feature, structure or characteristic described in connection with the embodiment is included in at least one embodiment. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

As used in this specification and the appended claims, the singular forms “a,” “an,” and “the” include plural referents unless the content clearly dictates otherwise. It should also be noted that the term “or” is generally employed in its sense including “and/or” unless the content clearly dictates otherwise.

The headings and Abstract of the Disclosure provided herein are for convenience only and do not interpret the scope or meaning of the embodiments.

Figure 1:
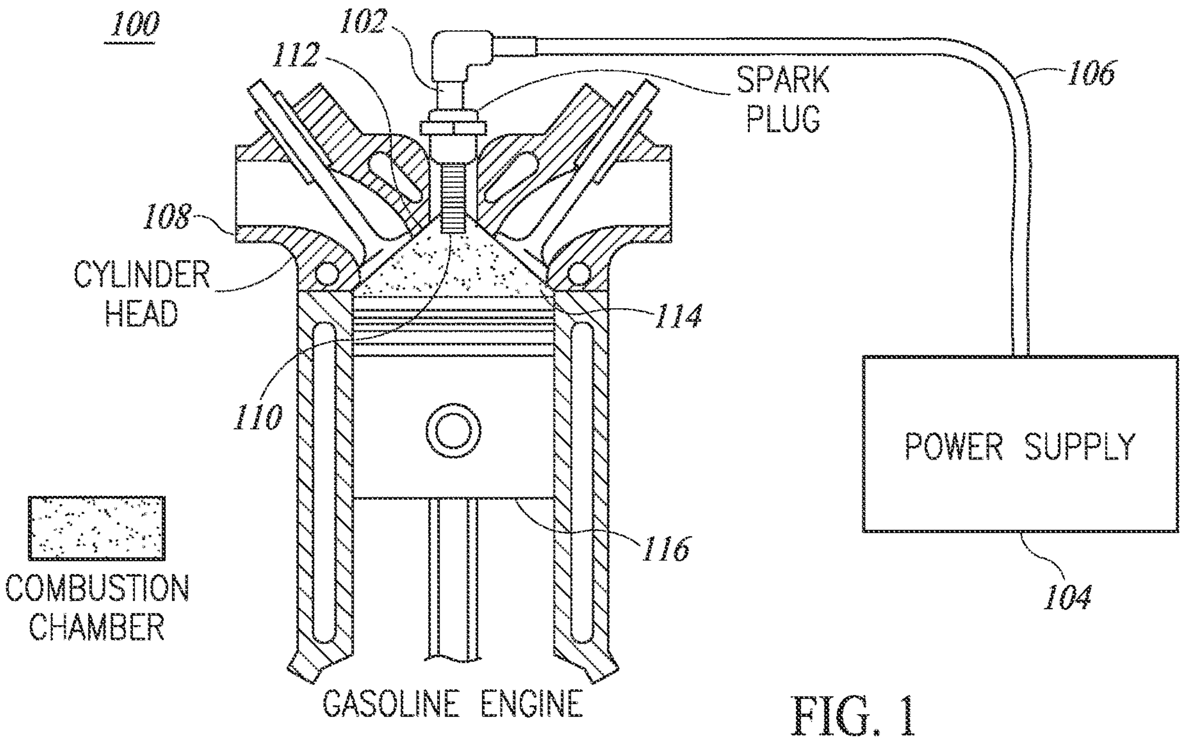
FIG. 1 is a cross-sectional view of an ignitor in the form of a spark plug according to at least one illustrated implementation, installed in a combustion chamber of an internal combustion engine and driven by a power supply via a coaxial cable, the power supply operable to generate a plurality of voltage pulses per ignition event.
Figure 2:
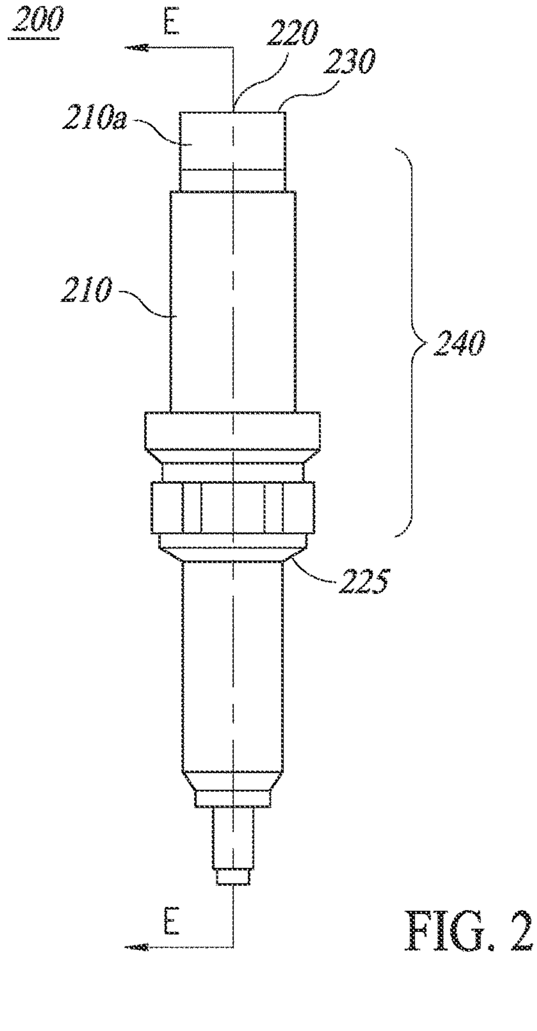
FIG. 2 is a side elevational view of the ignitor in the form of a spark plug illustrated in FIG. 1, according to at least one illustrated implementation.

FIG. 1 shows a system 100 that comprises at least one ignitor 102 (e.g., a spark plug) and a power supply 104 electrically coupled to the ignitor 102 via a coaxial cable 106, according to at least one illustrated implementation.

The ignitor 102 may, for example, be physically coupled to a portion of an internal combustion engine (ICE) 108, for example with a spark gap 110 of the ignitor 102 positioned in an interior of a combustion chamber 112. A spark produced across the spark gap 110 can ignite a fuel-air mixture 114 contained in the combustion chamber 112 to cause a piston 116 of the internal combustion engine 108 to move outwardly (downward in FIG. 1). While FIG. 1 shows one ignitor 102, one power supply 104, and one coaxial cable 106, some implementations may include a plurality of ignitors 102, a plurality of power supplies 104 and a plurality of coaxial cables 106, for example where the internal combustion engine 108 includes a plurality combustion chambers 112 and pistons 116.

The disclosed ignitor (e.g., spark plug 102) employs a structure that is favorable to realizing surface flashover on a dielectric (e.g., ceramic, porcelain) insulator when driven by a power supply 104 (e.g., pulse generator).

As described herein the power supply 104 is operable to generate a plurality of voltage pulses per ignition event. In some implementations, the voltage pulses may have durations on the scale of nanoseconds, hence the power supply may be denominated as a pulse generator or a nanosecond pulse generator. While any power supply capable of providing a plurality of voltage pulses per ignition event may be employed, some specifically advantageous pulse generators employing a closed feedback loop are described herein. The term ignition event refers to a spark or arcing ignited by one voltage pulse applied to an ignitor and maintained by one or more subsequent voltage pulses applied to the ignitor. As described herein, the subsequent voltage pulses in an ignition event may advantageously be provided at a lower amplitude that the initial voltage pulse in the ignition event.

FIGS. 2, 3, 4 and 5 show an ignitor in the form of a spark plug 200, according to at least one illustrated implementation.

The spark plug 200 includes a casing 210 having a first end 225 and a second end 230. The second end 230 forms a first electrode 210*a*. The ignitor or spark plug 200 also includes a second electrode 220 that protrudes outwardly from an opening 245 (best illustrated in FIGS. 3 and 5) at the second end of the casing 210. An electrical insulator 215 (best illustrated in FIGS. 3-5) surrounds a portion of the second electrode 220. The electrical insulator 215 is preferably a dielectric, and hence is referred interchangeable herein as electrical insulator or dielectric.

Figure 3:
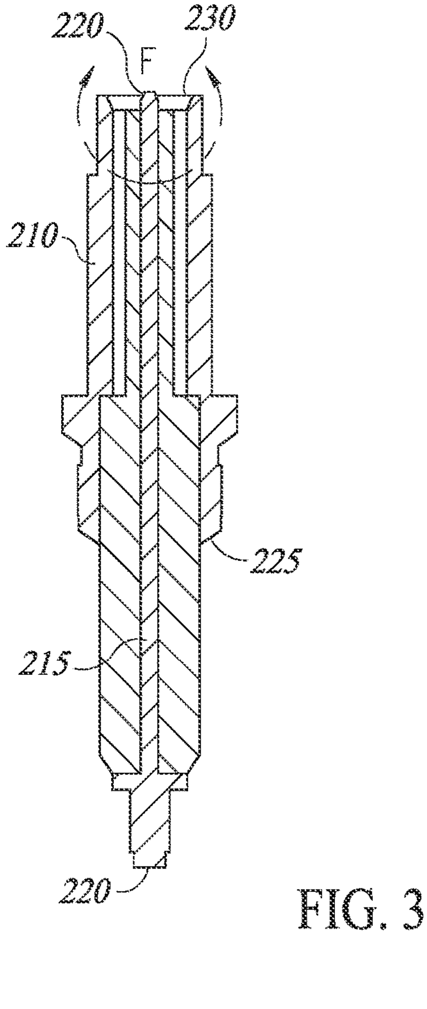
FIG. 3 is a cross-sectional view taken along E-E of the ignitor in the form of a spark plug illustrated in FIG. 1, according to at least one illustrated implementation.

As best shown in FIG. 3, the casing 210 includes a longitudinally extending passage 260 that includes an opening 245 (best illustrated in FIGS. 4 and 5) in the casing 210 at the second end 230. The casing 210 has an end wall 250 (best illustrated in FIG. 4) having an interior surface 252 at the second end 230.

Figure 4:
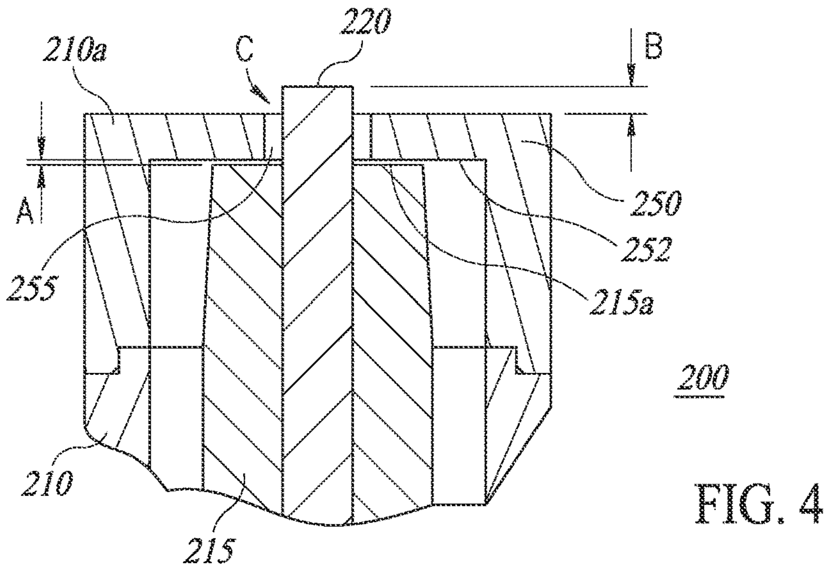
FIG. 4 is a cross-sectional detailed view of a portion F of the ignitor or in the form of a spark plug illustrated in FIG. 3.
Figure 5:
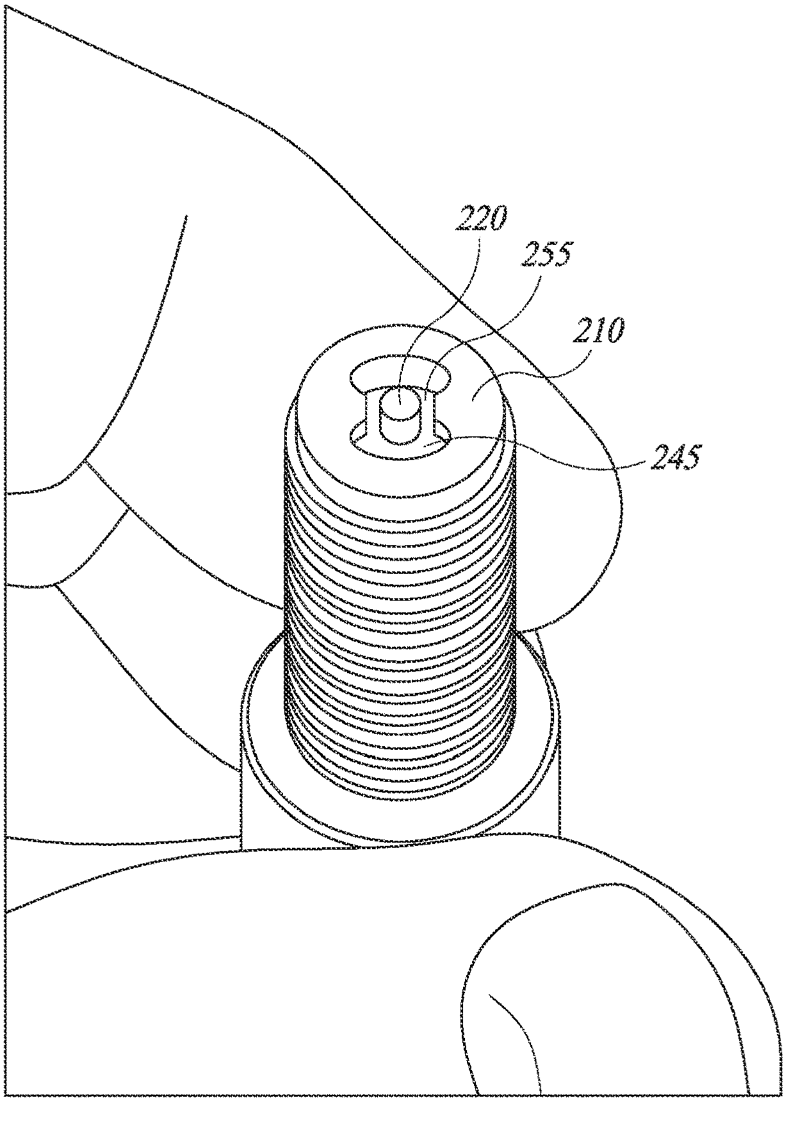
FIG. 5 is an illustration of the second end of the ignitor in the form of a spark plug, according to at least one illustrated implementation.

The second electrode 220 extends along at least a portion of the longitudinally extending passage and protrudes longitudinally outward from the opening 245 at the second end 230 of the casing 210. As best illustrated in FIGS. 4 and 5, the second electrode 220 is laterally spaced inwardly from the opening 245 to form an spark gap C between the first and the second electrodes at the second end 230 of the casing 210. As best illustrated in FIGS. 4 and 5, the electrical insulator 215 is located in the longitudinally extending passage of the casing 210, and surrounds a portion of the second electrode 220. The electrical insulator 215 has a terminus 215*a* that is at least closely spaced to the interior surface 252 of the end wall 250 at the second end 230 of the casing 210.

Conventional spark plugs typically include a center, longitudinally extending, electrode and a J-shaped or L-shaped electrode that is welded to a periphery of a metal casing with the short leg of the J-shape or L-shape extending perpendicularly to the center electrode, defining a spark gap that extends along a longitudinal axis of the conventional spark plug. In contrast to such conventional spark plugs, in the spark plug 200, the first electrode 210*a* is formed as part of casing 210 itself, in particular as and/or at an opening 245 in an end wall 250 thereof. In contrast to such conventional spark plugs, in the spark plug 200, the second electrode 220 extends through the opening 245 of the casing 210, spaced laterally inward of the first electrode 210*a*, with the spark gap 255 defined therebetween. The spark gap 255 is advantageously rotated 90 degrees as compared to the spark gap of a conventional J-gap spark plug. The opening 245 has a smooth inner surface or profile, for instance, circular, oval, or as illustrated having multiple lobes, two shown in a figure-8 configuration. This advantageously avoids sharp edges at the electrodes, reducing the risk of arcing. The protrusion of the second electrode 220 past the second end 230 of the casing 210 advantageously positions any sharp edges of the second electrode outside the spark gap 255, again reducing the risk of arcing.

Normally in the structure of a conventional spark plug, the electrical insulator (e.g., dielectric) surrounding the second electrode is recessed from the second electrode. In contrast, the electrical insulator or dielectric 215 of the ignitor or spark plug 200 is positioned to create a strong field where the field lines are as perpendicular to the desired flashover surface of the dielectric as reasonably possible. For example, for the geometry of the illustrated ignitor or spark plug 200 the electrical insulator or dielectric 215 is positioned at least proximate the first electrode 210*a* at a predefined distance A. The predefined distance A may, for the illustrated geometry may, for example, be equal to or less than approximately 0.05 inches (+/−10 percent). In some implementations, the electrical insulator or dielectric 215 of the ignitor or spark plug 200 is preferably adjacent and in contact with a portion of the first electrode 210*a* (i.e., predefined distance A=0.00).

The ignitor, for example the spark plug 200, is driven with voltage pluses with durations on the scale of nanoseconds, which creates an opportunity for surface flashover that is marked with an arrow C (see, e.g., FIG. 4). In at least some implementations, the ignitor, for example the spark plug 200, is driven using Transient Plasma System (TPS) nanosecond pulse power technology, at least one particularly advantageous implementation of which is described herein with reference to FIGS. 6-9.

Surface flashover of a dielectric can occur when using pulsed power electronics. Although surface flashover varies with the specifics of the material, for the dielectrics (e.g., ceramics, porcelain) used in a typical automotive spark plug, the pulse amplitude required to cause surface flashover is approximately ½ the voltage required to breakdown a spark gap of the same distance. Using ½ the voltage translates into ¼ the power (Ohm's Law shows that power equates to voltage-squared over the same resistance).

With a conventional J-gap spark plug, the TPS system is normally operated above expected spark gap breakdown voltage. If breakdown did not occur with the initial pulses in a combustion event, pulse energy was converted to plasma in some cases, presumably aiding in combustion.

With a system provided with the improved ignitor or spark plug 200 which is structured in the disclosed manner, the TPS system can be operated at roughly half the voltage previously targeted. The first pulse in an ignition event then causes surface flashover. This flashover has two observable effects. First, it extends the measurable lean limit. That is, when tested in a static cell, the spark plug 200 can ignite leaner air fuel mixes when operated at the lower voltage level where flashover occurs than at a higher voltage where the spark gap rapidly breaks down.

Second, although the current flowing between the electrodes in a surface flashover is very low, the spark gap above it subsequently exhibits "spark gap recovery" like behavior. In brief, when an spark gap is broken down and allows a spark its ability to hold off voltage is greatly diminished for a period of time. This state permits the TPS system to operate normally, providing nanosecond pulse sparks to ignite and develop the combustion kernel as needed, but the pulses can be at a greatly diminished amplitude. The ignitor or spark plug 200 structured in the disclosed manner permits this condition to be utilized without the need for an initial, high power, high current pulse to break down the spark gap, reducing power requirements.

Without being tied to theory, the working hypothesis for both these desirable effects is that the surface flashover induces the aerosol changes. Something akin to a pool of free radicals is created that both makes it easier for subsequent pulses to break down the spark gap and form a plume that leads to a larger initial combustion kernel.

It should be noted applicant has developed other intellectual property to sense and respond to different pulse/spark plug outcomes (U.S. provisional patent application 63/156,155, filed Mar. 3, 2021). The disclosed systems and methods permit desired modes of operation to be maintained much more easily because, unlike a J-gap ignitor or other conventional spark plug, in various ones of the disclosed implementations the voltage threshold for plasma operation and spark breakdown are far apart with no overlap.

In addition to significantly lowering power requirements and more consistently inducing desirable plasma effects, the described systems and methods help improve durability and likely combustion outcome another way.

In addition to changing the position at which the dielectric is located, the tip of the second electrode 220 is also relocated, i.e., the tip extends beyond the end of the ignitor or spark plug 200 to a predetermined distance B. In preferred implementations, the distance is approximately 0.03 inches (+/−20 percent).

Tests repeatedly reveal that TPS generator generated nanosecond pulses initiate at the edge of the electrode tip in a J-gap spark plug, presumably because the sharp edge of such a tip induces an enhanced electrical field. This concentrates pulse energy and the edge rapidly deteriorates.

As the edge deteriorates, field enhancement is reduced, raising the voltage requirement for reliable breakdown higher. In addition to concentrating on the electrode edge, arcs also disadvantageously strike a concentrated point on the J-gap counter electrode. As that spot erodes, the effective gap size increases, requiring higher voltages and power for continued operation.

With the sharp edge moved out of the spark gap 255 to the distance B, in the manner shown in FIG. 4, the arc initiation and strike points are greatly randomized. As such, the ignitor or spark plug 200 of the system and method advantageously provides significantly lower power flowing between the electrodes. In addition, wear is also advantageously spread out to larger electrode areas which increases durability. Positioning the tip of the second electrode 220 to protrude longitudinally outward from the opening 245 at the second end 230 of the casing 210 may further advantageously create a larger effective gap size during kernel development.

Figure 6:
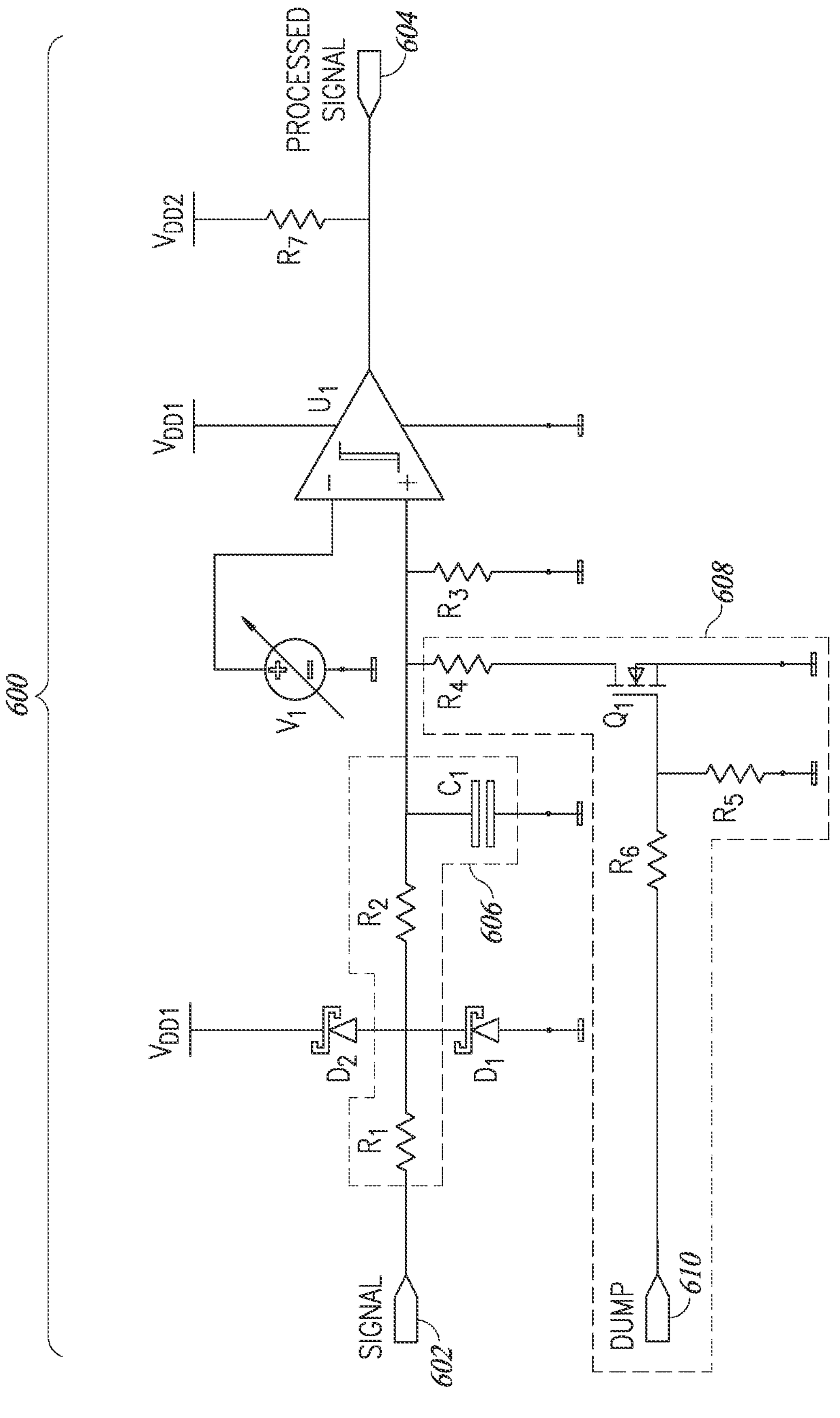
FIG. 6 is a schematic diagram showing an exemplary unipolar amplitude-to-time conversion (ATC) sense circuit of a power supply coupled and operable to supply a plurality of voltage pulses (e.g., nanosecond voltage pulses) per ignition event for driving the ignitor in the form of a spark plug of FIGS. 1-4, according to at least one illustrated implementation.

FIG. 6 is an exemplary schematic of a unipolar amplitude to time conversion (ATC) sense circuit 600 of a system (e.g., power supply, pulse generator, nanosecond pulse generator) for driving the ignitor or spark plug 200, according to at least one illustrated implementation. While often described in terms of generating voltages pulses of nanosecond duration, such is intended to be illustrative and not necessarily narrowing. In at least some implementations, a power supply or generator may provide voltage pulses with durations on scales longer than nanoseconds, for instance of durations on the scale of milliseconds. In at least some implementations, a power supply or generator may provide voltage pulses of different durations, for instance some at nanosecond scale and some at millisecond scale.

The unipolar ATC sense circuit 600 has an input terminal 602 to receive an input signal (Signal) and an output terminal 604 to provide an output signal (Processed Signal) via a comparator $U_1$. The input signal (Signal) may be supplied from a probe that measures and attenuates a high voltage pulse output from a pulse generator.

The unipolar ATC sense circuit 600 features clamping diodes $D_1$, $D_2$ at the input terminal 602, to clamp the input signal (Signal) between $-V_F$ and $V_{DD1}+V_F$, where $V_F$ is a forward voltage of the clamping diodes $D_1$ and $D_2$. This diode clamping circuit permits only unipolar, in this case positive, voltages to appear at a positive input terminal of the comparator $U_1$.

The unipolar ATC sense circuit 600 also includes a filter (encompassed by broken line box 606) comprised of resistors $R_1$ and $R_2$ and a capacitor $C_1$ to filter the input signal (Signal). The filtered and attenuated signal is input to comparator $U_1$, which compares the attenuated and filtered signal against a DC reference provided by the adjustable voltage source Vi. A bandwidth of the filter 606 $((R_1+R_2)-C_1)$ and a waveshape of the input signal (Signal) work together to create outputs from the comparator $U_1$ with sufficiently discrete durations that a duration of the output (interchangeably Mode or Processed Signal) of the comparator $U_1$, can be measured and used to differentiate the type of discharge or discharge mode that has occurred. The comparator $U_1$ has an open-collector output to enable input-to-output level-shifting, enabling a wider input amplitude dynamic range, while guaranteeing an output voltage that is within nominal maximum operating limits of a set of electronics that receive the output signal (Processed Signal).

The unipolar ATC sense circuit 600 also includes a dump circuit (encompassed by broken line box 608), comprising a transistor $Q_1$, an dump input 610, and resistors $R_4$, $R_5$, $R_6$ for a clearing signal (Dump). The clearing signal (Dump) is used to gate the transistor $Q_1$ so that the capacitor $C_1$ of the filter can be rapidly discharged, and the unipolar ATC sense circuit 600 reset for a subsequent measurement, after the output signal (interchangeably Mode or Processed Signal Mode) has been processed.

In operation, the unipolar ATC circuit 600 differentiates between different types of discharges driven by an electrical pulse. The input (Signal) to the ATC circuit 600 is derived from a voltage or current of an electrical pulse. This signal looks significantly different for different discharge modes due to the differences in discharge impedance and transmission line effects from a cable that connects a pulse generator to a load (e.g., ignitor, or spark plug 200). By filtering the attenuated signal with an R-C filter, a processed signal (Processed Signal) is derived that is compared against a buffered analog voltage reference provided by an adjustable DC voltage source Vi. The duration of time that the processed signal (Processed Signal) exceeds the reference voltage is different for different discharge modes. This result in output signals from the common-collector comparator $U_1$, that have different durations corresponding to the mode of discharge. The Dump input drives a transistor $Q_1$ that discharges the signal on capacitor $C_1$ to reset the ATC circuit 300 before another pulse is fired by the pulse generator. The discharge mode is determined based on three factors: did a PWM pulse occur, if a PWM pulse occurred when did the PWM pulse start relative to the original pulse event (i.e., delay), and what is the duty cycle of the PWM pulse (i.e., pulse duration).

Figure 7:
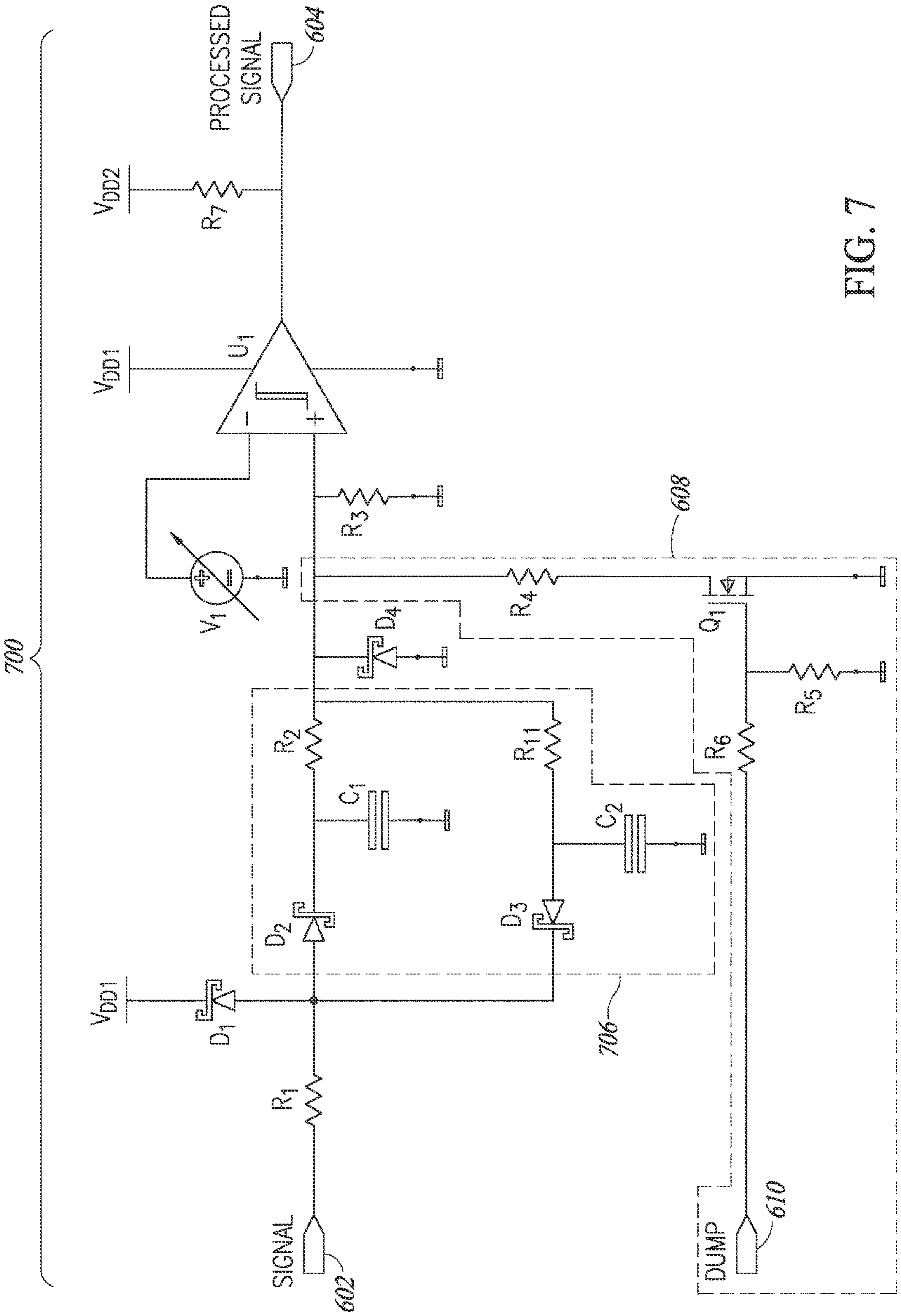
FIG. 7 is a schematic diagram showing an exemplary bipolar amplitude-to-time conversion (ATC) sense circuit of a power supply coupled and operable to supply a plurality of voltage pulses (e.g., nanosecond voltage pulses) per ignition event for driving the ignitor in the form of the spark plug of FIGS. 1-4, according to at least one illustrated implementation.

FIG. 7 is a schematic of a bipolar amplitude to time conversion (ATC) sense circuit 700 of the system (e.g., power supply, pulse generator, nanosecond pulse generator) for driving the ignitor or spark plug 200, according to at least one illustrated implementation. As noted below, some components of the bipolar ATC circuit 400 are similar or even identical to those of the unipolar ATC circuit 600.

The bipolar ATC circuit 700 has an input terminal 602 to receive an input signal (Signal) and an output terminal 604 to provide an output signal (Processed Signal) via a comparator $U_1$. The input signal (Signal) may be supplied from a probe that measures and attenuates a high voltage pulse output from a pulse generator.

The bipolar ATC circuit 700 features a bipolar adding circuit (encompassed by broken line box 706) that sums positive and negative portions of a waveform of the input signal (Signal). The bipolar adding circuit comprises diodes $D_2$ and $D_3$, capacitors $C_1$ and $C_2$, and resistors $R_2$ and The bipolar ATC circuit 700 also includes a diode $D_1$ that clamps a maximum positive voltage from the input (Signal) to $V_{DD1}+V_F$, where $V_F$ is a forward voltage drop of the diode $D_1$. The bipolar ATC circuit 400 also includes a diode $D_4$ that clamps the signal produced by the bipolar adding circuit to a minimum voltage of $-V_F$, where $V_F$ is a forward voltage of the diode $D_4$.

The configuration of the remaining components of the bipolar ATC circuit 700 operate in a similar fashion to the corresponding components of the unipolar ATC circuit 600 (FIG. 6), so discussion of such is not repeated in the interest of conciseness.

In operation, the rectifying diodes $D_2$, $D_3$ steer positive and negative voltage to capacitors $C_1$, $C_2$, respectively. Both positive and negative signals are low-pass-filtered by the resistor/capacitor pairs $R_1$-$C_1$ and $R_1$-$C_2$. The signals are then recombined through the resistors $R_2$, $R_{11}$ and fed into the comparator $U_1$.

It has been determined in experiments and simulations that adding the positive and negative portions of the input waveform derived from the high voltage output of the pulse generator increases versatility in the ATC circuit 700 because such enables differentiation between discharge modes measured at more measurement points in a system. Specifically, the unipolar ATC sense circuit 600 works best for input signal that are sensed in close proximity to an ignitor or spark plug because transmission line effects between a pulse generator and the ignitor or spark plug may compromise an integrity of the output signal (Processed Signal) produced by the unipolar ATC sense circuit 600 when the sensing is located spatially away from the ignitor or spark plug. In contrast, the bipolar ATC sense circuit 700 can be located anywhere between the pulse source (e.g., pulse generator) and a load (e.g., ignitor or spark plug), which is enabled by the fact that the oscillating waveforms that occur after the nanosecond duration pulse drives the ignitor or spark plug are relatively symmetric. The bipolar ATC sense circuit 400 advantageously uses rectification and summation of the two filtered waveforms, removing transmission line effects, to provide a sufficiently accurate signal with enough information to process the signal and determine discharge mode and amplitude.

A pulse amplitude of a subsequent pulse may be adjusted based on detected discharge mode, for instance via a pulse width modulated (PWM) charging circuit (e.g., a PWM half-bridge charging circuit or PWM full-bridge charging circuit, powered by DC-DC supply). The PWM half-bridge charging circuit or PWM full-bridge charging circuit turn ON and OFF for appropriate periods of time to ramp a current through an opening switch.

Figure 8:
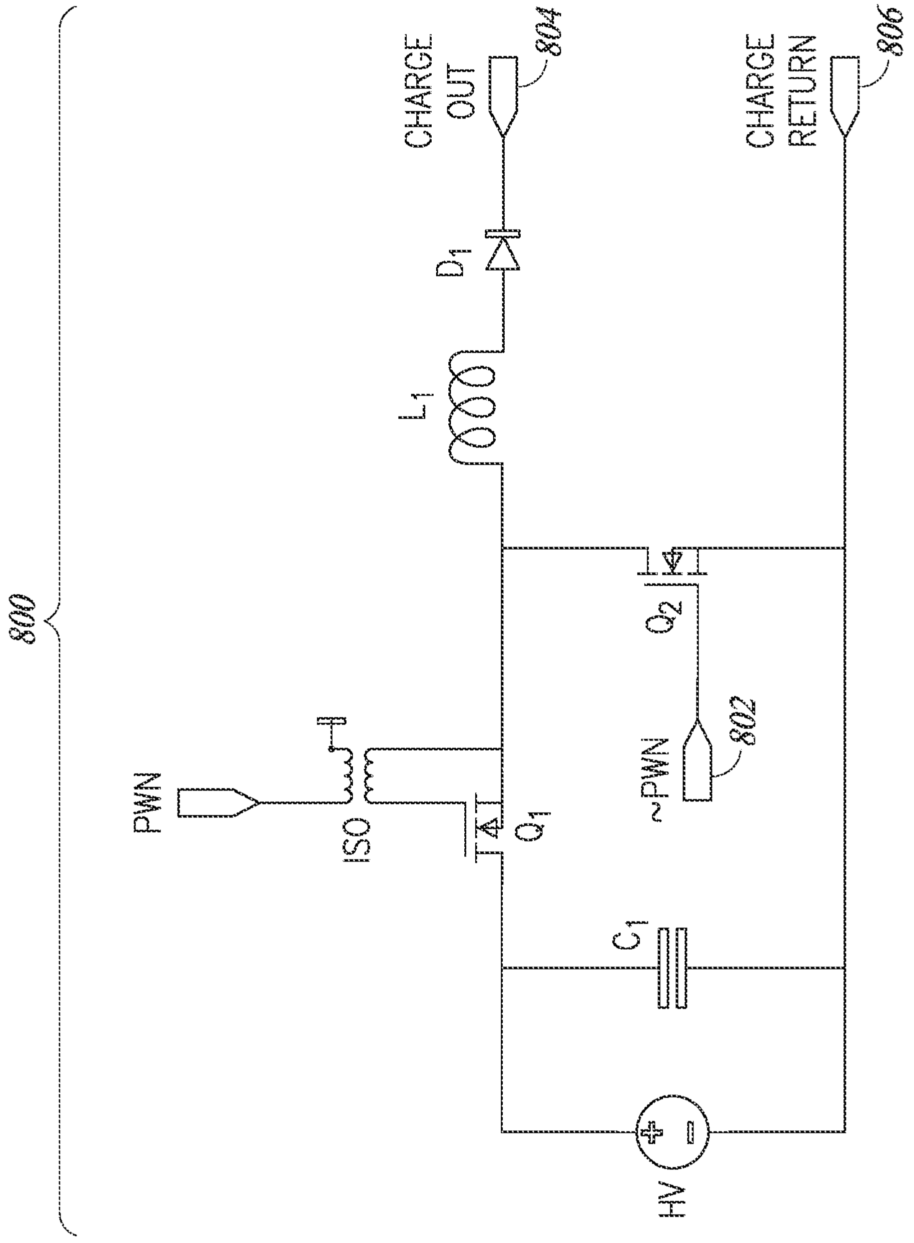
FIG. 8 is a schematic diagram showing a pulse width modulated (PWM) charging circuit of a power supply coupled and operable to supply a plurality of voltage pulses (e.g., nanosecond voltage pulses) per ignition event according to at least one illustrated implementation, the PWM charging circuit used to adjust the output voltage amplitude and pulse energy of an output of a pulse generator.

FIG. 8 shows an exemplary pulse width modulated (PWM) charging circuit 800 of a system (e.g., power supply, pulse generator, nanosecond pulse generator) for driving the ignitor or spark plug 200, according to at least one illustrated implementation.

The PWM charging circuitry 800 may advantageously be used to adjust an output voltage amplitude and/or pulse energy of an output of a pulse generator. The PWM charging circuitry 800 has an input terminal 802 to receive a pulse width modulated signal (PWM), a charge output terminal 804 and a charge return terminal 806. The input terminal 802 is coupled to a gate of a first transistor Q1 of the PWM charging circuitry 800 via an isolation transformer ISO to supply the input signal (PWM) thereto. The input signal (PWM) is also supplied to a gate of a second transistor Q2 of the PWM charging circuitry 800.

The PWM charging circuitry 800 also includes a high voltage source HV, a bypass capacitor $C_1$, an inductor $L_1$, and a rectifying diode $D_1$. The high voltage source HV is electrically coupled between the charge output terminal 804 and the charge return terminal 806, via the inductor $L_1$ and the rectifying diode $D_1$. The bypass capacitor $C_1$ and the second transistor $Q_2$ are both electrically coupled in parallel with the high voltage source HV and one another. The bypass capacitor $C_1$ stores sufficient charge to supply a high frequency burst of pulses.

A duration of the input signal (PWM) may advantageously be determined using an algorithm, for example, an algorithm flashed onto a microcontroller or other processor that analyzes the output signal from an ATC sense circuit (e.g., unipolar ATC sense circuit 600, bipolar ATC sense circuit 700). Depending on the type of discharge or discharge mode determined by the microcontroller or other processor, the PWM signal is adjusted to either increase or reduce pulse amplitude and/or to end the pulse train delivered to a load (e.g., ignitor or spark plug). The sense and control circuit described herein is capable of making additional changes to pulse parameters, including, but not limited to, adjusting pulse amplitude in other ways, e.g., by adjusting a DC voltage level that is input to a charging circuit. PWM approach is one method of adjusting voltage amplitude, although other approaches may be employed.

In operation, the PWM charging circuit is gated by the microcontroller or other processor and appropriate gate drive circuitry (FIG. 8), where two transistors $Q_1$, $Q_2$, are driven by complimentary gate signals to achieve pulse width modulation. The input signal (PWM) gates the first transistor $Q_1$ to turn ON, and in response current flows through the inductor $L_1$ and the rectifying diode $D_1$. When the transistor $Q_1$ is conducting, charge is transferred from the capacitor $C_1$ through the inductor $L_1$ to the load capacitor of the pulse generator that is connected to node "Charge Out". The amount of charge transferred is regulated by the amount of time that the transistor $Q_1$ is conducting. When the transistor $Q_1$ turns OFF, the transistor $Q_2$ turns ON to provide a conducting path so that the energy stored in the inductor $L_1$ as a current may continue flowing until it is fully transferred to the load capacitance. The transistor $Q_2$ may also be replaced by a diode if the forward loss is acceptable and there is not a need for active control of this node. If the duration of input signal (PWM) is less than a half resonant period (T/2), where T is a resonant period determined by the inductor $L_1$ and the load capacitance connected to the charge output terminal 504 (Charge Out), the second transistor $Q_2$ provides a conduction path for the current flowing through the inductor $L_1$ to transfer the remaining inductively stored energy to the load capacitor connected to the charge output terminal 804 (Charge Out).

Figure 9:
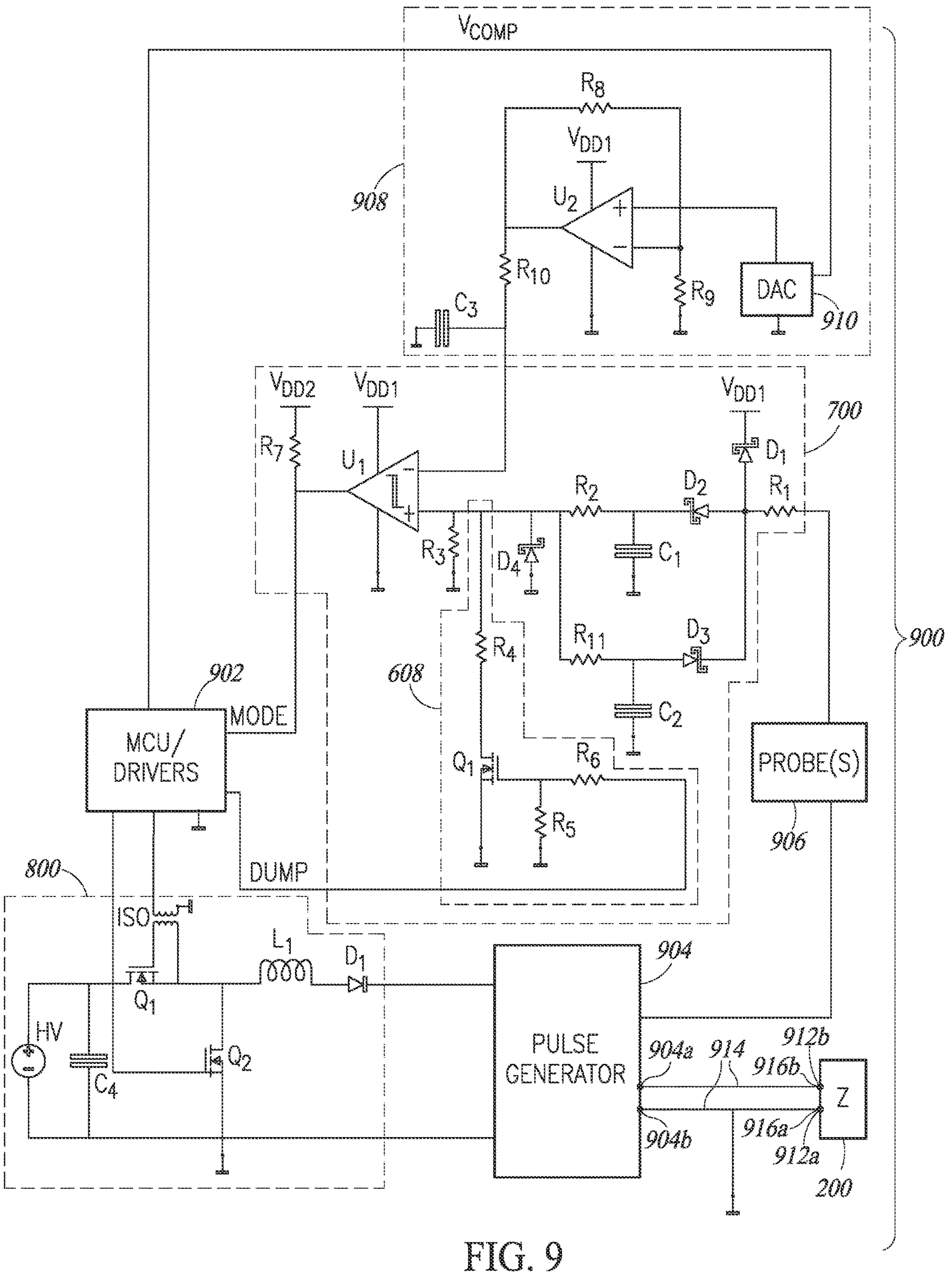
FIG. 9 is a schematic diagram showing of a system according to at least one illustrated embodiment, which uses the bipolar ATC sense circuit of FIG. 3, the PWM charging circuit of FIG. 8 and a microcontroller (MCU).

FIG. 9 shows an exemplary system 900 (e.g., power supply, pulse generator, nanosecond pulse generator) for driving the ignitor or spark plug 200, according to at least one illustrated implementation.

The system 900 includes the bipolar ATC sense circuit 700 (FIG. 7), the PWM charging circuit 800 (FIG. 8), a microcontroller (MCU) 902, which are operable to detect an output waveform and reflected waveforms at output electrodes 904*a*, 904*b* of a pulse generator 904, the output waveform and reflected waveforms which are sensed via one or more sensors 906 (Probe(s)), and a comparison circuit 908 which is operable to compare the signal sensed by the sensors 606 to a reference voltage level. The reference voltage level may advantageously be programmed by the MCU 902. For example, the microcontroller 902 may be communicatively coupled to a digital-to-analog converter (DAC) 910 of the comparison circuit 908, for instance to set a value of the reference voltage. The comparison circuit 908 includes a comparator U2, coupled to the DAC 910 to receive the reference voltage.

The one or more sensors 906 can include voltage sensors and/or current sensors that attenuate the signals to achieve an appropriate dynamic range determined, for example by $V_{DD1}$ of the ATC circuit 700. The one or more sensors 606 can be positioned at one, two, or even more locations from output terminals 904*a*, 904*b* of the pulse generator 904 to the input terminals 912*a*, 912*b* of a load 200 (e.g., ignitor or spark plug, represented with associated impedance Z). The output terminals 904*a*, 904*b* of the pulse generator 904 may be electrically coupled to the input terminals 912*a*, 912*b* of the load 200 via one or more cables 914, via one or more a cable/ignitor or cable/spark plug interfaces 916*a*, 916*b*. For example, one or more sensors 906 can be positioned at any one or more of: an output 904*a*, 904*b* of a pulse generator 904, a cable/ignitor or cable/spark plug interface 916*a*, 916*b*, or a location along a cable 914 that connects the pulse generator 904 to the load 200 (e.g., an ignitor or a spark plug).

In the exemplary implementation illustrated in FIG. 9, an output voltage or current are measured by a sensor 906, which attenuates the signal and feeds the attenuated input signal into the bipolar ATC circuit 700. As previously explained, the bipolar ATC circuit 700 separates the positive and negative portions of the attenuated input signal, by means of the diodes $D_2$ and $D_3$, and low pass filters both positive and negative signals by the filter formed by resistor/capacitors $R_1$-$C_1$ and $R_1$-$C_2$. The positive and negative signals are added through the resistors $R_2$ and $R_{11}$, creating a signal that the comparison circuit 908 compares against the reference voltage, for example a reference voltage derived from the DAC 910, which is programmed by the microcontroller 902.

The load impedance (Z) is that of an ignitor or spark plug (e.g., load 200) designed to strike a discharge when excited by the electric pulse generated by the pulse generator 904. Depending on the pressure and temperature of the ambient fuel-air mixture surrounding the ignitor and the voltage, duration, and energy of the pulse, the discharge of the ignitor may be one of the following types or modes: no discharge, a transient plasma or non-equilibrium discharge, or a nanosecond spark.

The bipolar sense circuit 700, described in the detailed description for FIG. 7, compares a filtered and attenuated signal derived from the output voltage or current of the pulse generator 904. This processed signal, input to the positive terminal of the comparator $U_1$, is compared against an adjustable DC reference voltage Vi. The different discharge modes result in a processed signal that will exceed the constant voltage reference signal for different periods of time, resulting in output waveforms from the comparator $U_1$ of different durations for different discharge modes. Thus, the durations in output waveforms from the comparator $U_1$ may be used in determining the discharge type or mode.

The output signal (Processed Signal) from the ATC circuit 900 comes from the comparator $U_1$ and is fed to the microcontroller 902. The microcontroller 902 measures the duration of the signal and bins the measured durations according to a defined logic, for example a pre-programmed algorithm. Each bin corresponds to a respective one of the discharge types or discharge modes. This microcontroller 902 is advantageously operable to identify the discharge type or discharge mode before a subsequent pulse is fired, using simple time measurements, enabling the microcontroller 902 executing an algorithm to timely decide how to either adjust to pulse amplitude, modify the pulse repetition rate, end the pulse train, or adjust the number of pulses in a burst.

To determine the discharge mode based on the signal (identified as Processed Signal in FIG. 7 and identified as Mode in FIG. 9) that is produced by the comparator $U_1$ of the bipolar ATC circuit 400 as illustrated in FIG. 9, the microcontroller 902 performs three basic tests on the signal. The first test is to determine whether comparator $U_1$ produced an output signal (Mode) during a defined test interval. The test interval is the period of time beginning when the pulse generator 904 outputs a high voltage pulse and ending at the time at which the microcontroller is programmed to trigger the pulse generator 904 to produce a subsequent pulse minus a time required to run or execute decision code/instructions. If no signal is detected during this interval, the microcontroller 902 determines that a no discharge occurred, indicating, setting or otherwise characterizing the type of discharge event or discharge mode as a no discharge event or no discharge mode. The second and third tests are only conducted if the result of the first test indicates that a signal was detected during the defined test interval. If a signal is detected, the second test performed is to measure a delay, that is the time from when the pulse generator outputs a high voltage pulse to when a rising edge of a positive square wave generated by the comparator $U_1$ occurs (i.e., when did the signal "Mode" begin relative to the generation of the high voltage pulse?). The third test is to measure a duration of the square wave signal generated by comparator $U_1$. The pulse width is indicative of the amount of time that the reference voltage is applied to the negative input terminal of comparator $U_1$, making its duration proportional to the amount of charge and/or energy deposited in the discharge. In the borderline case, the duration may exceed the allowed test window (i.e., defined test interval), requiring a dump circuit 308 to discharge capacitor $C_1$ at the end of the defined test interval. In the event that the result of the first test indicates that comparator $U_1$ generated a signal, the MCU's algorithm analyzes the results from the second and third tests to determine whether the discharge should be characterized as a transient plasma/non-equilibrium discharge, or a nanosecond spark.

The methods and structures described herein advantageously require very little computational power. The methods and structures described herein advantageously employ time space, which may be measured with conventional timer and timer/capture modules commonly found in microcontrollers. Although variations are possible, a representative algorithm is set out immediately below.

Figure 10:
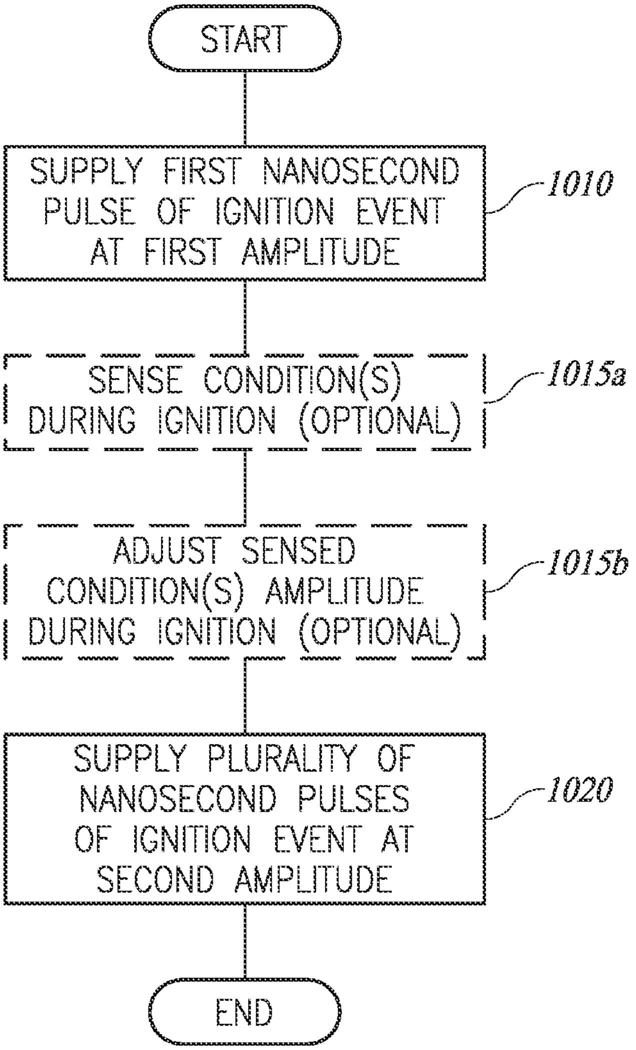
FIG. 10 is a flowchart of the method, according to at least one illustrated implementation.

1. Start of pulse sequence
   a. Release Dump feature
   b. Reset timers for pulse generation and pulse measurement
2. Start the timer(s) used for pulse generation and the timer(s) used for pulse measurement concurrently
3. Wait until the pulse repetition rate period has nearly expired
4. Check the following measurements
   a. Did a measurement pulse occur?
   b. When did the pulse occur relative to the start of timers?
   c. What is the pulse width?
5. Apply Dump feature
6. Based on the measurements, determine discharge type or discharge mode
7. Make adjustments (e.g., make algorithmic adjustments, for instance adjusting power, terminating pulse train, etc.)
8. Wait for next event If the algorithm determines to end the pulse train, the microcontroller 902 stops outputting trigger signals to the charging circuit shown in FIG. 8 and FIG. 9. If the algorithm determines that the pulse amplitude should be adjusted based on the previous discharge mode, the microcontroller 602 will change the duration of the PWM signal to transistors $Q_1$ and $Q_2$ shown in FIG. 9. A description of how the PWM circuit operates can be found above in the detailed description for FIG. 8. FIG. 10 is a flowchart of the method of operation in a plasma assisted spark ignition system 100, where the plasma assisted spark ignition system 100 comprises at least a first ignitor or spark plug 200 and at least a first power supply 104. The method comprises supplying, by the first power supply 104, a first voltage pulse (e.g., first nanosecond voltage pulse) of an ignition event to the first ignitor or spark plug 200 at a first amplitude to generate surface flash over on the electrical insulator or dielectric 215 of the first ignitor or spark plug 200, as indicated in FIG. 10 by 1010. Optionally, the condition(s) occurring during the ignition event are sensed (1015*a*), and there is also the option to adjust the amplitude of the subsequent voltage pulses (e.g., subsequent nanosecond voltage pulses) of the ignition event (1015*b*) based at least in part on the sense condition(s) that occur during the ignition event, where these acts are illustrated in FIG. 10 by boxes having dashed lines. Next, a plurality of subsequent voltage pulses (e.g., subsequent nanosecond voltage pulses) of the ignition event is subsequently applied to the first ignitor or spark plug by the first power supply 104 at a second amplitude (see 1020 in FIG. 10).

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. All of the above U.S. patents, U.S. patent application publications, U.S. patent applications, foreign patents, foreign patent applications and non-patent publications referred to in this specification and/or listed in the Application Data Sheet, including but not limited to commonly owned: U.S. Pat. No. 10,072,629; U.S. patent application Ser. No. 16/254,140; U.S. patent application Ser. No. 16/254,146; U.S. patent application Ser. No. 12/703,078; U.S. provisional patent application 62/699,475; U.S. provisional patent application 62/844,587; U.S. provisional patent application 62/844,574; U.S. patent application Ser. No. 16/861,658; and U.S. provisional patent application 63/156,155, are each incorporated herein by reference, in their entirety.

Aspects of the implementations can be modified, if necessary, to employ systems, circuits and concepts of the various patents, applications and publications to provide yet further implementations.

The various embodiments and examples described above are provided by way of illustration only and should not be construed to limit the claimed invention, nor the scope of the various embodiments and examples. Those skilled in the art will readily recognize various modifications and changes that may be made to the claimed invention without following the example embodiments and applications illustrated and described herein, and without departing from the true spirit and scope of the claimed invention, which is set forth in the following claims. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

We claim:

1. A plasma assisted spark ignition system, comprising:

at least a first ignitor, the first ignitor comprising: a casing having a first end, a second end that forms a first electrode, and a longitudinally extending passage which includes an opening in the casing at the second end and an end wall having an interior surface at the second end, a second electrode that extends along at least a portion of the longitudinally extending passage and which protrudes longitudinally outward from the opening at the second end of the casing and which is laterally spaced inwardly from the opening to form a spark gap between the first and the second electrodes at the second end of the casing, and an electrical insulator located in the longitudinally extending passage of the casing, surrounding a portion of the second electrode, and which has a terminus that is at least closely spaced to the interior surface of the end wall at the second end of the casing; and at least a first power supply coupled and operable to supply a plurality of voltage pulses per ignition event via at least one of the first or the second electrodes of the first ignitor;

wherein the plurality of voltage pulses per ignition event are each less than approximately 3 milliseconds in duration; and wherein the at least a first power supply is operable to supply a first voltage pulse of an ignition event to the first ignitor at a first amplitude, and to subsequently supply a plurality of subsequent voltage pulses of the ignition event at reduced amplitudes relative to the first amplitude.

2. The plasma assisted spark ignition system of claim 1 wherein the terminus is spaced within approximately 0.05 inches of the interior surface of the end wall at the second end of the casing.

3. The plasma assisted spark ignition system of claim 1 wherein the second electrode is laterally spaced inwardly from the opening by approximately 0.016 inches to approximately 0.30 inches to form the spark gap between the first and the second electrodes at the second end of the casing.

4. The plasma assisted spark ignition system of claim 1 wherein the second electrode protrudes longitudinally outward from the opening at the second end of the casing by approximately 0.03 inches.

5. Plasma assisted spark ignition system of claim 1 wherein the end wall has a thickness of approximately 0.04 inches measured in a longitudinal extending direction.

6. The plasma assisted spark ignition system of claim 1 wherein there are no sharp edges in within the spark gap between the opening at the second end and the second electrode.

7. The plasma assisted spark ignition system of claim 1 wherein opening at the second end has two lobes in a figure-8 profile.

8. The plasma assisted spark ignition system of claim 1 wherein the electrical insulator is a dielectric.

9. The plasma assisted spark ignition system of claim 8 wherein the first electrode, the second electrode, the spark gap, and the dielectric are arranged and dimensioned to generate a surface flash over on the dielectric in response to at least a first voltage pulse of an ignition event.

10. The plasma assisted spark ignition system of claim 8 wherein the first electrode, the second electrode, the spark gap, and the dielectric are arranged and dimensioned to generate a surface flash over on the dielectric in response to at least a first low voltage pulse of a first ignition event.

11. The plasma assisted spark ignition system of claim 1 wherein the at least a first power supply is operable to supply a first voltage pulse of an ignition event to the first ignitor at a first amplitude to generate a surface flash over on the electrical insulator of the first ignitor.

12. The plasma assisted spark ignition system of claim 1 wherein the at least a first power supply is operable to supply the first voltage pulse of the ignition event to the first ignitor at the first amplitude to generate a spark, and subsequently to supply the plurality of subsequent voltage pulses of the ignition event at the reduced amplitudes relative to the first amplitude to maintain the spark.

13. The plasma assisted spark ignition system of claim 1 wherein the at least a first power supply is operable to supply the first voltage pulse of the ignition event to the first ignitor at the first amplitude to generate a surface flash over on the electrical insulator of the first ignitor and generate a spark, and subsequently to supply the plurality of subsequent voltage pulses of the ignition event at the reduced amplitudes relative to the first amplitude to maintain the spark.

14. The plasma assisted spark ignition system of claim 1 wherein the at least a first power supply is operable to adjust the amplitude of one or more of the plurality of voltage pulses of the first ignition event based on one or more sensed conditions.

15. The plasma assisted spark ignition system of claim 1 wherein the plurality of voltage pulses per ignition event are nanosecond voltage pulses.

16. The plasma assisted spark ignition system of claim 1 wherein the plurality of voltage pulses per ignition event are each approximately one nanosecond in duration.

17. The plasma assisted spark ignition system of claim 1 wherein the first ignitor is a plug having the second end located in an interior of a combustion chamber, and is communicatively coupled to the first power supply via a coaxial cable.

18. A method of operation in a plasma assisted spark ignition system, the plasma assisted spark ignition system comprising at least a first ignitor and at least a first power supply, the first ignitor comprising: a casing having a first end, a second end that forms a first electrode, and a longitudinally extending passage which includes an opening in the casing at the second end and an end wall having an interior surface at the second end, a second electrode that extends along at least a portion of the longitudinally extending passage and which protrudes longitudinally outward from the opening at the second end of the casing and which is laterally spaced inwardly from the opening to form a spark gap between the first and the second electrodes at the second end of the casing, and an electrical insulator located in the longitudinally extending passage of the casing, surrounding a portion of the second electrode, and which has a terminus that is at least closely spaced to the interior surface of the end wall at the second end of the casing, the method comprising:

supplying, by the first power supply, a first voltage pulse of an ignition event to the first ignitor at a first amplitude to generate a surface flash over on the electrical insulator of the first ignitor; and subsequently supplying, by the first power supply, a plurality of voltage pulses of the ignition event to the first ignitor.

19. The method of claim 18 wherein the surface flash over on the electrical insulator of the first ignitor lower an amount of energy needed to maintain a spark across the spark gap, and wherein subsequently supplying a plurality of subsequent voltage pulses of the ignition event includes subsequently supplying the plurality of subsequent voltage pulses of the ignition event at reduced amplitudes relative to the first amplitude to maintain the spark across the spark gap with an input energy that is lower than an input energy used to generate the surface flash over on the electrical insulator.

20. The method of claim 19 wherein supplying a first voltage pulse of an ignition event to the first ignitor at a first amplitude includes supplying the first voltage pulse of the ignition event at the first amplitude to generate a spark in the spark gap, and subsequently supplying a plurality of subsequent voltage pulses of the ignition event at reduced amplitudes relative to the first amplitude includes subsequently supplying the plurality of subsequent voltage pulses of the ignition event at the reduced amplitudes to maintain the spark in the spark gap.

21. The method of claim 18, further comprising:

adjusting an amplitude of one or more nanosecond voltage pulses of the ignition event supplied by the first power supply during the ignition event.

22. The method of claim 18 wherein supplying a first voltage pulse of an ignition event to the first ignitor at a first amplitude includes supplying a first nanosecond voltage pulse at the first amplitude.

23. The method of claim 18 wherein supplying a first voltage pulse of an ignition event to the first ignitor at a first amplitude includes supplying a first voltage pulse at the first amplitude having a duration of less than 10 nanoseconds.

24. The method of claim 18 wherein supplying a first voltage pulse of an ignition event to the first ignitor at a first amplitude includes supplying a first voltage pulse at the first amplitude having a duration of less than 3 milliseconds.

25. A plasma assisted spark ignition system, comprising:

at least a first ignitor, the first ignitor comprising: a casing having a first end, a second end that forms a first electrode, and a longitudinally extending passage which includes an opening in the casing at the second end and an end wall having an interior surface at the second end, a second electrode that extends along at least a portion of the longitudinally extending passage and which protrudes longitudinally outward from the opening at the second end of the casing and which is laterally spaced inwardly from the opening to form a spark gap between the first and the second electrodes at the second end of the casing, and an electrical insulator located in the longitudinally extending passage of the casing, surrounding a portion of the second electrode, and which has a terminus that is parallel to and at least closely spaced to the interior surface of the end wall at the second end of the casing; and at least a first power supply coupled and operable to supply a plurality of voltage pulses per ignition event via at least one of the first or the second electrodes of the first ignitor, one, more or all of the plurality of voltage pulses per ignition event each having a respective duration of less than 10 nanoseconds.

* * * * *